(12) United States Patent
Olsson et al.

(10) Patent No.: US 8,526,974 B2
(45) Date of Patent: Sep. 3, 2013

(54) LOCATING A SOURCE OF WIRELESS TRANSMISSIONS FROM A LICENSED USER OF A LICENSED SPECTRAL RESOURCE

(75) Inventors: Thomas Olsson, Karlshamn (SE); Anders Rosenqvist, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 429 days.

(21) Appl. No.: 12/758,744

(22) Filed: Apr. 12, 2010

(65) Prior Publication Data

US 2011/0250908 A1     Oct. 13, 2011

(51) Int. Cl.
*H04W 24/00*     (2009.01)

(52) U.S. Cl.
USPC ............ 455/456.5; 455/456.1; 455/456.2; 455/450; 455/452.1; 455/452.2; 455/67.11; 455/67.13; 455/522; 455/509; 370/328; 370/329; 370/330; 370/338; 370/431

(58) Field of Classification Search
USPC ................ 455/25, 63.1, 63.4, 67.11, 67.13, 455/114.2, 278.1, 296, 404.1, 404.2, 456.1–457, 455/524, 525, 560, 561, 562.1, 450, 451, 455/452.1, 452.2, 453, 422.1, 522, 456.2, 455/456.3, 456.5, 456.6; 370/310, 310.2, 370/328, 329, 335, 338, 341, 491, 500, 330, 370/431, 433
See application file for complete search history.

(56) References Cited

U.S. PATENT DOCUMENTS

| | | | |
|---|---|---|---|
| 6,259,917 B1 * | 7/2001 | Elzein | ................... 455/435.2 |
| 6,708,032 B2 | 3/2004 | Willingham et al. | |
| 6,775,520 B2 | 8/2004 | Subotic et al. | |
| 6,952,587 B2 | 10/2005 | Whikehart et al. | |
| 7,050,755 B2 | 5/2006 | Kline | |
| 7,233,800 B2 | 6/2007 | Laroia et al. | |
| 7,430,430 B2 | 9/2008 | Li et al. | |
| 7,509,146 B2 | 3/2009 | Leabman | |
| 7,539,496 B1 | 5/2009 | Sousa et al. | |

(Continued)

FOREIGN PATENT DOCUMENTS

WO    2008/039872 A2    4/2008
WO    2010/151829 A2    12/2010

OTHER PUBLICATIONS

Braun, C. et al. "Evaluation of Antenna Diversity Performance for Mobile Handsets Using 3-D Measurement Data", IEEE Transactions on Antennas and Propagation, pp. 1736-1738, vol. 47, No. 11, Nov. 1999. ISSN: 0018-926X.

(Continued)

*Primary Examiner* — Olumide T Ajibade Akonai
(74) *Attorney, Agent, or Firm* — Potomac Patent Group PLLC

(57) ABSTRACT

Own communication equipment locates a source of wireless transmissions, the own equipment including a serving base station (BS). The serving BS receives, from remote sensors including at least one user equipment (UE), sensing information from which transmitter location information ("location information") can be determined. The location information is oriented in a serving BS coordinate system. The location information can comprise white space sensing information from which a direction of a transmitter relative to a position of the UE can be determined, and pilot signal sensing information from which respective directions of one or more BSs relative to the position of the UE can be determined. The BS transforms the white space and pilot signal sensing information into the location information. Geographical safety margins are determined from the location information, and BS transmissions are adjusted to limit transmitting signals beyond the geographical safety margin area.

23 Claims, 7 Drawing Sheets

(56) References Cited

U.S. PATENT DOCUMENTS

| | | | |
|---|---|---|---|
| 7,995,526 B2 * | 8/2011 | Liu et al. | 370/329 |
| 8,064,475 B2 * | 11/2011 | Henry | 370/433 |
| 8,138,975 B2 * | 3/2012 | Bull et al. | 342/450 |
| 8,170,597 B2 * | 5/2012 | Shan et al. | 455/522 |
| 2004/0014498 A1 | 1/2004 | Grego | |
| 2004/0203921 A1 | 10/2004 | Bromhead et al. | |
| 2006/0009211 A1 | 1/2006 | Sato | |
| 2006/0067354 A1 | 3/2006 | Waltho et al. | |
| 2008/0070507 A1 | 3/2008 | Stoyanov | |
| 2008/0076450 A1 * | 3/2008 | Nanda et al. | 455/456.1 |
| 2008/0085727 A1 | 4/2008 | Kratz | |
| 2008/0153501 A1 | 6/2008 | Harris et al. | |
| 2008/0293358 A1 | 11/2008 | Andersson et al. | |
| 2009/0061779 A1 | 3/2009 | Gurney et al. | |
| 2009/0137237 A1 | 5/2009 | Nakashima et al. | |
| 2010/0048234 A1 * | 2/2010 | Singh | 455/509 |
| 2010/0124940 A1 * | 5/2010 | Hassan et al. | 455/509 |
| 2010/0165913 A1 * | 7/2010 | Ang et al. | 370/328 |
| 2010/0195580 A1 * | 8/2010 | Samarasooriya et al. | 370/329 |
| 2010/0195590 A1 * | 8/2010 | Park | 370/329 |
| 2010/0309317 A1 * | 12/2010 | Wu et al. | 348/180 |
| 2011/0043710 A1 * | 2/2011 | Samarasooriya et al. | 348/735 |
| 2011/0164186 A1 * | 7/2011 | Sadek et al. | 348/724 |
| 2011/0182257 A1 * | 7/2011 | Raveendran et al. | 370/329 |

OTHER PUBLICATIONS

EP Communication, dated Jul. 22, 2011, in connection with counterpart EP Application 11160186.0-1248.

Akan, O. et al. "Cognitive radio sensor networks" IEEE Network, IEEE Service Center, New York, NY, US, vol. 23, No. 4, Jul. 1, 2009, ISSN: 0890-8044, D0I:10.1109/MNET.2009.5191144.

Zhi Quan et al. "Optimal Multiband Joint Detection for Spectrum Sensing in Cognitive Radio Networks" Mar. 1, 2009, IEEE Transactions of Signal Processing, IEEE Service Center, New York, NY, US, pp. 1128-1140, XP011248851, ISSN: 1053-587X.

EP Article 94(3) Communication, dated Jan. 31, 2013, in connection with European Patent Application No. 11160186.0-1248.

* cited by examiner

LOCATING A SOURCE OF WIRELESS TRANSMISSIONS FROM A LICENSED USER OF A LICENSED SPECTRAL RESOURCE

BACKGROUND

The present invention relates to wireless communications, and more particularly to the sensing of wireless transmissions from a user of a spectral resource.

The radio spectrum is a limited resource that should be shared between many different types of equipment such as cellular, home network, broadcast, and military communication equipment. Historically, each part of the radio spectrum has been allocated to a certain use (called a "licensed" and/or "primary" use). This strategy has resulted in all applications/uses being disallowed on the allocated carrier frequency except for those applications included in the license agreement. In practice, this results in large parts of the radio spectrum being unused much of the time. For instance, in the Ultra-High Frequency (UHF) band, where TV broadcasts take place, large geographical areas are unused, mainly due to the large output power needed for such applications; this large output power compels a large reuse distance in order to minimize the risk of interference. An example of such geographical areas within Scandinavia is illustrated in FIG. 1. In FIG. 1, the shaded areas represent geographic locations in which a given carrier frequency is being used by a licensed user (e.g., by Broadcast TV). In the remaining areas, the so-called "white spaces", the given carrier frequency is allocated to the licensed user but is not actually being used by that user.

In order to make better use of the licensed spectral resources, some countries will, in the future, allow unlicensed services (so called "secondary" uses) to take place in areas (called "white spaces") in which the licensed (primary) user is not transmitting. However the primary user will always have priority for the use of the spectrum to the exclusion of others. Therefore, some kind of sensing mechanism is needed in the (unlicensed) devices to enable them to detect whether a licensed user is currently transmitting. If such licensed use is occurring, the unlicensed user needs to turn off its transmission on that carrier frequency. The most straightforward sensor is a signature detector adapted to detect specific signatures transmitted from the licensed/primary user (typically implemented as a matched filer).

Another consideration regarding the sensing of the licensed user's transmissions is placement of the sensors. When the secondary (e.g., unlicensed) use is for cellular telecommunications, one solution is to include the sensors in the base station of the mobile communication system. Sometimes, the base station's (or network's) own sensors do not provide enough information (e.g., information about the geographical positions of active white space transmitters) for the base stations to have a clear picture of white space spectrum availability as a function of geographical position. Without this information, it is difficult for a base station to use the white space fully. To compensate for this lack of information, it may be necessary to impose quite wide safety margins (for example with respect to frequency and/or power) in order to prevent the unlicensed user's interfering with the primary (licensed) user's use of white space frequencies.

The base station/network may use input from its sensors to estimate received powers at the sensors from a white space transmitter and, given the powers at the known positions of the sensors, infer where the white space transmitter may be located. However, if the propagation conditions of the paths to the different sensors are different and/or if there are a plurality of simultaneous white space transmitters, then such inference may end up wrong.

As an alternative, the base station/network may use input from its sensors to identify the location of white space transmitters by means of triangulation (i.e., positioning using so called multilateration). However, at least three sensors with reliable propagation paths from the white space transmitter are required for two-dimensional multilateration (two sensors give only one hyperbolic curve of possible positions). Finding three such sensors may not be a problem, but the multilateration process itself is based upon estimating time differences of arrival of the white space transmitter output to the different sensors. For a white space transmitter with unknown signal content (i.e., no known pilots or synchronization signals to use as time references), it may be required that large amounts of base band sensor data be transmitted to a common node in the network, where the estimation of the time differences of arrival may be performed (e.g., by correlation methods at a baseband level). In some situations there may even be a plurality of white space transmitters that simultaneously transmit unknown signal content at the same frequency from different locations. In such instances, multilateration (using the unknown content of the signals) at a baseband level will run into difficulties when trying to separate and correlate signals.

For the sake of clarity, the problems discussed above have been presented in the context of an unlicensed user wishing to detect the presence of a licensed user's signals. However, such problems are not limited to situations involving only licensed and unlicensed users, but can arise whenever communication equipment wishes to operate in a geographical area without disturbing transmissions from other communication equipment.

Therefore, there is a need for systems and methods that enable communication equipment to locate other transmitters operating within a given geographical area in an efficient and reliable manner.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that enable own mobile communication system equipment to locate a transmitter that is using a spectral resource, wherein the own mobile communication system equipment includes a serving base station that serves at least one user equipment (UE). Such operation involves the serving base station receiving, from each one of two or more remote sensors, sensing information from which transmitter location information can be determined, wherein the transmitter location information is oriented in a coordinate system used by the serving base station and wherein the remote sensors include at least one user equipment. One or more geographical safety margins are determined from the transmitter location information. Transmissions from the serving base station are then adjusted to limit transmitting signals into a geographical area bounded by the one or more geographical safety margins. Adjusting transmissions from the serving base station to limit transmitting signals into the geographical area bounded by the one or more geographical safety margins can involve, for example, adjusting a power level and/or a frequency of a signal transmitted by the serving base station.

In some embodiments, the sensing information reported by each user equipment includes white space sensing information from which a direction of the transmitter relative to a position of the user equipment can be determined; and pilot signal sensing information indicative of a respective one or more directions of one or more base stations, wherein the pilot signal sensing information is oriented in a steering plane of the user equipment, wherein the one or more base stations may or may not include the serving base station. In such cases, the serving base station transforms the white space sensing information and the pilot signal sensing information received from the at least one user equipment into the transmitter location information oriented in a coordinate system used by the serving base station. The white space sensing information and the pilot signal sensing information can comprise, for example, information representing angles and received power at the respective angles.

Performing such a transformation, involves, in some embodiments, using the pilot signal sensing information to ascertain, for each of the at least one user equipment, respective steering plane orientation information. The serving base station then uses the steering plane orientation information of the at least one user equipment and the white space sensing information from the at least one user equipment to ascertain the transmitter location information in the coordinate system used by the serving base station.

In an aspect of some embodiments, the white space sensing information comprises information obtained by means of a first sweep of the user equipment receiver lobe and information obtained by means of a second sweep of the user equipment receiver lobe. Such embodiments compare the information obtained by means of the first sweep of the user equipment receiver lobe with the information obtained by means of the second sweep of the user equipment receiver lobe to ascertain a measure of scanning reliability. Elements of the white space sensing information that are associated with a measure of scanning reliability that does not satisfy a predetermined reliability requirement can then be ignored (i.e., filtered out).

In another aspect, a user equipment is operated to sense a transmitter that is using a spectral resource. This involves operating the user equipment to generate white space sensing information from which a direction of the transmitter relative to the position of the user equipment can be determined. The user equipment generates pilot signal sensing information indicative of a respective one or more directions of one or more base stations, wherein the pilot signal sensing information is oriented in a steering plane of the user equipment, wherein the one or more base stations may or may not include the serving base station. The user equipment communicates the white space sensing information and the pilot signal sensing information to a serving base station.

In some embodiments, operating the user equipment to generate the white space sensing information from which the direction of the transmitter relative to the position of the user equipment can be determined comprises sweeping a receiver lobe of the user equipment at least one revolution while making white space received power estimates to obtain a set of white space received power estimates as a function of direction. In some embodiments, sweeping the receiver lobe of the user equipment at least one revolution while making white space received power estimates to obtain a set of white space received power estimates as a function of direction comprises sweeping the receiver lobe of the user equipment at least two revolutions while making white space received power estimates to obtain at least two sets of white space received power estimates as a function of direction. In such embodiments, the user equipment can compare respective ones of the at least two sets of white space received power estimates as a function of direction with one another to obtain a measure of scanning reliability. The user equipment can then perform communicating the white space sensing information and the pilot signal sensing information to the serving base station only if the measure of scanning reliability satisfies one or more predetermined criteria.

In another aspect, operating the user equipment to generate the white space sensing information from which the direction of the transmitter relative to the position of the user equipment can be determined comprises sweeping a receiver lobe of the user equipment at least one revolution during a sweep time. White space received power estimates are made as a function of direction from the radio signal received during the sweep time. Only those white space received power estimates and their respective directions that satisfy predetermined reception power criteria are included within the white space sensing information.

BRIEF DESCRIPTION OF THE DRAWINGS

The objects and advantages of the invention will be understood by reading the following detailed description in conjunction with the drawings in which.

DETAILED DESCRIPTION

Figure 1:
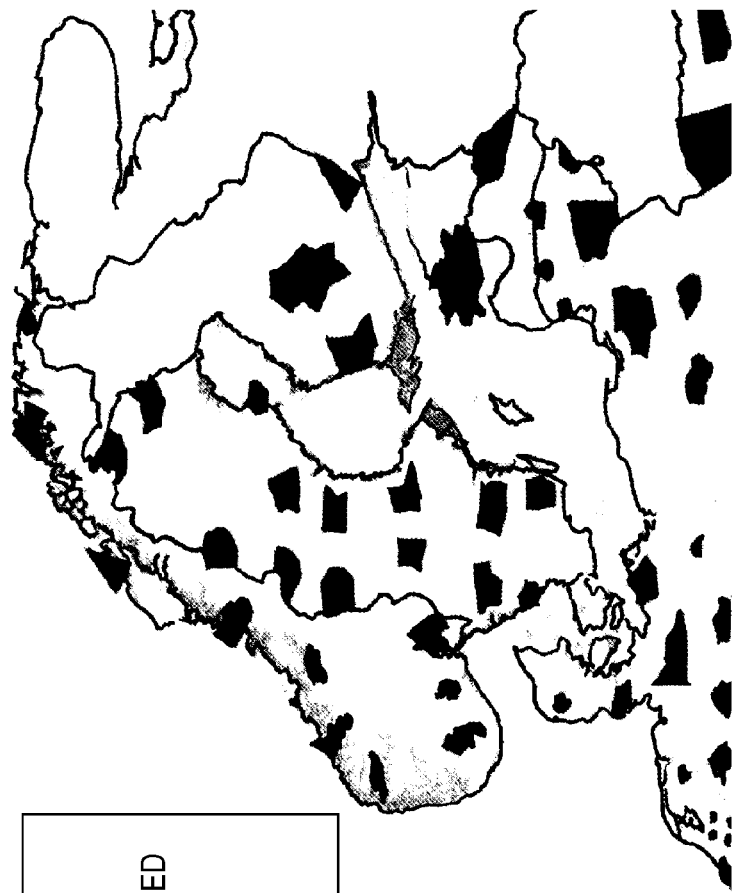
FIG. 1 illustrates geographical areas constituting so-called "white spaces" located in Scandinavia.

The various features of the invention are described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a user equipment (UE) in a mobile communication system, operating as an unlicensed user in a white space, performs a 3-dimensional (3D) sensing of white space transmitters, and reports the (possibly condensed) 3D sensing information to a base station/network. The reported information can, for example, include angles to white space transmitters; angles to base stations with known pilot patterns; and/or the GPS positions of the UEs and/or the received power levels at the UEs.

In another aspect, the base station/network uses the combined 3D sensing information from a plurality of UEs to estimate position(s) of the white space transmitter(s) and then calculate more specific safety margins based upon the position(s) of the white space transmitter(s). By using the received power levels (of white space transmitters that are under control of the base stations/network) detected at the UEs it is also possible, in some embodiments, to supervise the safety margins of these white space transmitters (i.e., the white space transmitters that the base station is able to control—Intended "safe" received signal levels are defined for certain geographical points. These "safe" levels have corresponding intended levels at the points where the sensing UEs are situated. By comparing the levels sensed by the UEs with the corresponding levels, the tailored output power can be supervised.).

These and other aspects will now be described in further detail.

Figure 2:
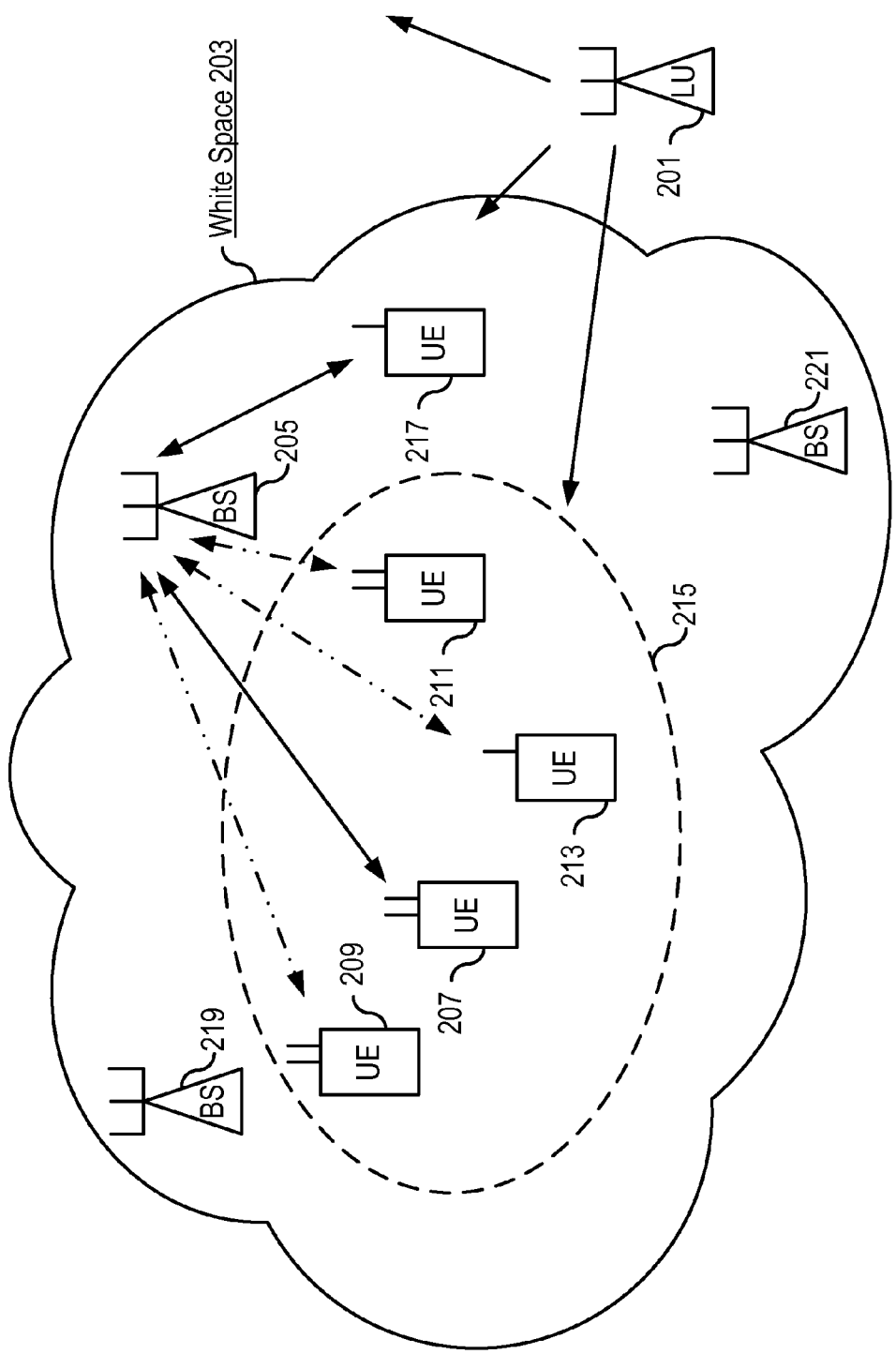
FIG. 2 is a block diagram of an exemplary system capable of carrying out various aspects of the invention.
Figure 3:
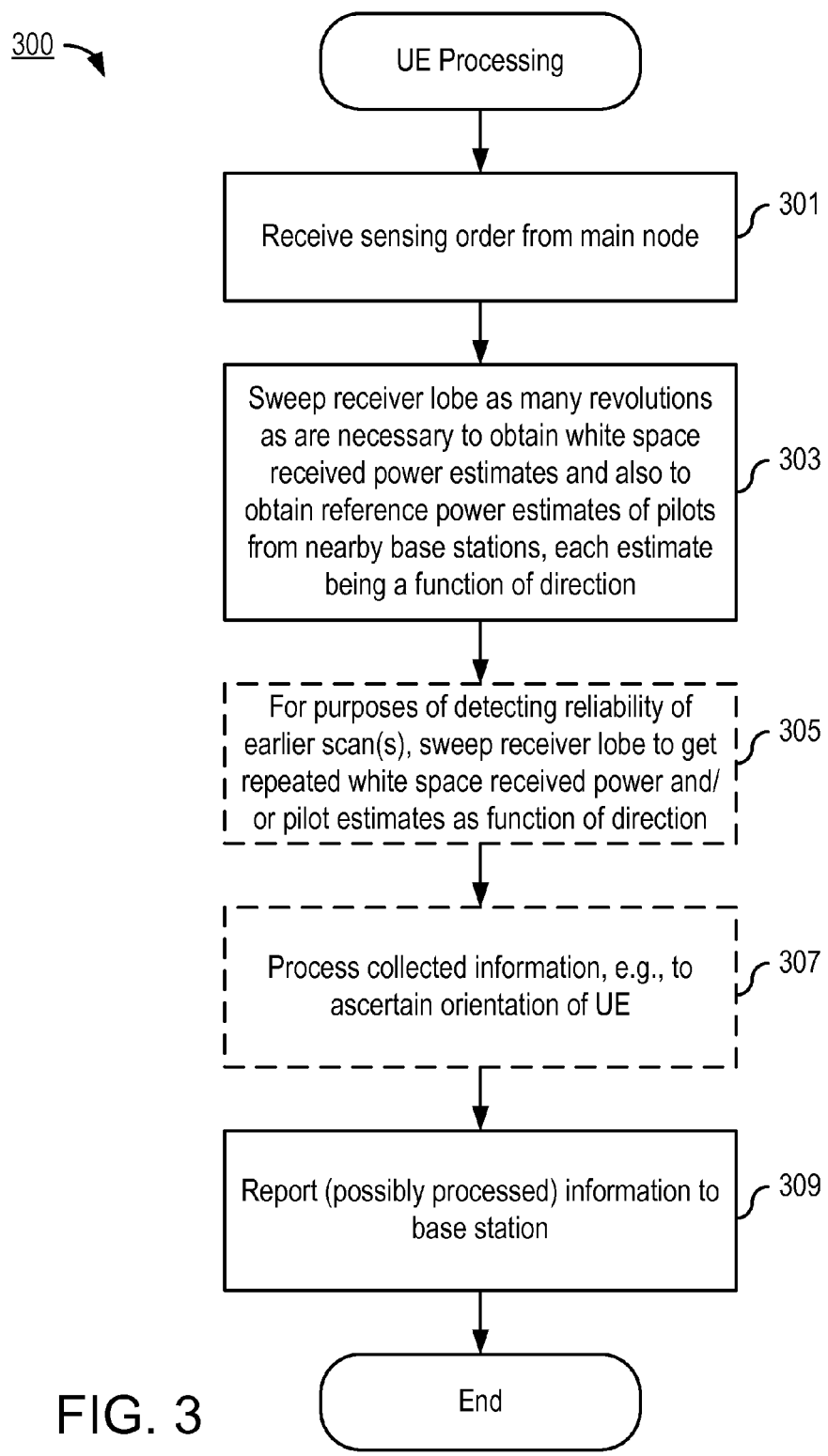
FIG. 3 is, in one respect, a flow chart of steps/processes/functions, carried out by an exemplary UE consistent with the invention.

Beginning first with FIGS. 2 and 3, FIG. 2 is a block diagram of an exemplary system capable of carrying out various aspects of the invention and FIG. 3 is, in one respect, a flow chart of steps/processes/functions, carried out by an exemplary UE consistent with the invention. In another respect, FIG. 3 can be considered to depict the various elements of circuitry 300 configured to carry out the various functions described in FIG. 3 and its supporting text.

In FIG. 2, a licensed user (LU) 201 is depicted operating within a geographic area that includes a white space 203. A mobile communication system is configured in accordance with various aspects of the invention to permit it to operate as an unlicensed user within the white space 203. The mobile communication system includes a serving base station 205 that serves one or more UEs, including the UEs 207, 209, 211, 213, and 217. In this illustrative embodiment, the UEs 207, 209, 211, and 213 are each equipped with circuitry configured to steer their receiver lobes (either using two or more receiver antennas that are used in a "synthetic aperture" or by means of a single receiver antenna having steerable directionality), and therefore constitute a group of UEs 215 that will carry out a detection process as described below. One non-limiting example of equipment that can be utilized in a UE to provide scanning functionality is described in U.S. patent application Ser. No. 12/758,742 to Andres Reial, entitled "Omni-Directional Sensing of Radio Spectra", filed on Apr. 12, 2010, which application is hereby incorporated by reference herein in its entirety. The UE 217 is illustrated having only a single receive antenna and is presumed not to be able to steer its receiver lobe; therefore, the UE 217 does not participate in this activity. In the context of the invention, the base station 205 exemplifies a "main node." In other embodiments different equipment constitutes the "main node." For example, in WLAN systems, a router can operate as a main node in the context of the invention. To facilitate readability of this document, the well-known term "base station" is used herein as a generic term that covers not only base stations in the traditional sense, but also all forms of radio access nodes in all forms of radio access technologies, of which cellular communication equipment and WLAN technology are but two examples.

Each of the UEs 207, 209, 211, and 213 within the group 215 includes circuitry configured to perform a 3D sensing process as will now be described with reference to FIG. 3. The UE (e.g., any of the UEs 207, 209, 211, and 213) is connected to the serving base station 205 (main node) and is ordered by the serving base station 205 to perform sensing at a certain carrier frequency (or set of frequencies) for a signal having a certain bandwidth (BW) (step 301).

In response to the sensing order, the UE sweeps its receiver lobe as many revolutions as are necessary to obtain white space received power estimates and also to obtain reference power estimates of pilots from nearby base stations, each estimate being a function of direction (step 303). The nearby base stations may or may not include the serving base station 205 as well as other base stations (e.g., the base station 219 and the base station 221) whose signals reach the UE. Taking a closer look at this aspect, typically, for a 2 receiver antenna solution, the steering can be made in a "steering plane" in a 3D space, but it is not always known how that plane is oriented (including, for example, in what direction the steering plane's zero-degree angle is really pointing relative to a coordinate system used by the serving base station 205). This is referred to herein as a "directional problem" because the UE may have a 3D orientation that is unknown or not even constant while the sensing measurements are performed). This problem is overcome as follows:

The receiver lobe is swept one revolution in the "steering plane" to get "white space received power" estimates and reference estimates of pilots from nearby base stations as a function of direction.

The receiver lobe is swept again (in the "steering plane") if several white space frequency bands are being scanned or if the base stations whose pilots are being measured are in another frequency band than the scanned white space, assuming that the UE is not capable of collecting this additional information all in one sweep. However, in UEs capable of supporting multiple frequency bands simultaneously, all of this information collecting can be performed during a single sweep of the receiver lobe. Thus, sweeping the receiver lobe "as many revolutions as are necessary" is ascertained based on the criteria discussed above.

In some, but not necessarily all embodiments, the receiver lobe is swept at least one additional revolution (still in the "steering plane") to get repeated "white space received power" and/or pilot estimates as function of direction (step 305—depicted in dashed lines to denote the optional nature of this feature). This supplemental information is collected to enable detection of the reliability of the scanning (e.g., by means of comparison of the several sets of collected data to determine the extent to which they are correlated with one another—the higher the correlation, the more reliable the data and the more constant the 3D orientation of the steering plane).

As a tradeoff between speed and angular resolution, a "sweep of the receiver lobe" as referenced in step 303 may be implemented as a sweep with quite coarse angular steps combined with finer angular steps close to local reception maxima. The partial sweeps using finer angular steps (which may be the most time consuming part of the procedure) may only have to be performed for the frequencies/frequency bands where there are any white space transmitters present and/or pilots to use.

"White space power estimates" may be obtained by means of simple energy integration of the baseband signal derived from the received signal using a suitable receiver bandwidth (set either by setting the radio bandwidth of the receiver or set by bandpass signal processing in the baseband of the receiver). The time consumed per analyzed frequency band and sweep angle is on the order of 1 ms and is mostly due to the need for integration over time of received signals. For a given probability of detection, the detection time depends on the signal to noise ratio ($O(1/SNR^2)$). As long as the SNR of the detected signal is not too low this detection time is low. The time to adjust the receiver for a new frequency band is dominated by the settling time for the local oscillator (LO) frequency synthesizer, which is on the order of 10-100 µs.

A special case occurs when the received signal is a spread-spectrum signal. Under such circumstances, simple energy integration may not be possible due to the low signal level compared to the noise floor. This case is handled by despreading the received signal. This despreading may add some milliseconds to the collection of sensing data.

In another aspect of some embodiments consistent with the invention, for a receiver with sufficient signal processing capabilities, it is possible to create embodiments in which several sweep angles are evaluated in parallel (i.e., using the same received signal sequences but with a unique linear combination of these for each sweep angle).

In yet another aspect of some embodiments consistent with the invention, a receiver having some free memory space "records" baseband signals for the two Rx antennas and then reuses these "recordings" when evaluating all the sweep angles. Such "recordings" may help to shorten the time period for which the UE will have to have a fairly constant orientation of the steering plane.

Further considering step 303, the reference estimates of pilots of nearby base stations (e.g., the base stations 205, 219, and 221) will typically have to be performed using some kind of pilot specific signal processing in the baseband of the receiver. For pilots generated in communication systems operating in accordance with Wideband Code Division Multiple Access/High Speed Packet Access (WCDMA/HSPA) standards, the unique scrambling code of each base station involved will have to be used in a separate despreading of the received WCDMA/HSPA signals. But, as for the "white space power estimates", it may be possible to "record" baseband signals for the two Rx antennas and then analyze these for combinations of sweep angles and scrambling codes of interest. Typically, the received signals may have to be recorded during a few milliseconds. Such "recordings" may, for the pilots, too, help to relieve requirements on fairly constant orientation.

The "white space received power" estimate as a function of direction may be used by the base station/network in combination with the reference estimates of pilots from nearby base stations as well as with the repeated estimates. Reference estimates of pilots are processed either by the base station/network, or, in alternative embodiments, by the UE (see optional step 307) to decide the orientation of the UE's steering plane (at least with respect to one dimension) to overcome the "directional problem". This is possible because the locations of the nearby base stations (oriented in a coordinate system used by the serving base station) are known by the system (and in some embodiments, also by the UE—see the discussion below). The UE's own measurement of angles associated with the pilot signal of these nearby base stations are therefore used as reference data from which the orientation of the UE's steering plane can be calibrated in the coordinate system used by the serving base station. In alternative embodiments, the directional information of licensed user signals as reported by the UE can be reoriented in the coordinate system used by the serving base station.

The repeated estimates will be used for estimating a measure of the reliability of the "white space received power" estimates (and in some embodiments, also the reliability of the pilot signals) from this UE (since if the UE has not had a fairly constant orientation during the lobe steering procedure or "recording" of the signals, the duplicate estimates will hardly be identical).

The reliability of the sensing information can be estimated in the UE and/or in the base station/network. However, if the latter is used, more information will likely be transmitted to the base station/network.

A single UE may transfer most of its information (e.g., the full "white space received power" estimates as a function of direction for a number of frequency bands and also the full reference estimates as a function of direction for a number of pilot signals) to the base station/network (step 309). In some alternative embodiments, a single UE transfers only the angles (of maximum reception) to the pilots together with angles (of maximum reception) to the white space transmitters (and their frequencies).

In yet other alternative embodiments, a single UE can be supplied with information about the geographical positions of the nearby base stations whose pilots it is receiving, and then transform its estimated angles to the white space transmitters from its own reference system (with unknown 3D orientation) to angles situated in a system-wide latitude and longitude reference system. Otherwise, the base station performs this transformation. Techniques for performing this reference system transformation are discussed further below.

For some antenna configurations, the receiver lobe will have both a (desired) forward direction and a (possibly less desired) backward direction. Side lobes may also be present. There may then be at least two angles of (local) maximum reception for each actual transmitter. When using angle information from a plurality of UEs, it will, however, be quite easy to discard the "false" directions on a system level.

The discussion will now focus on techniques for compensating for the fact that the orientation of the steering plane in which each UE makes angular measurements is unknown. It is assumed that the coordinate system in which the UE and base stations are represented is flat enough to be approximated by the simplest basic linear algebra 3D perpendicular x, y, z fixed coordinate system. In the assumed coordinate system, the UE and a Base Station number i, herein denoted BSi, may have the coordinates (xU,yU,zU) and (xBi,yBi,zBi) respectively. The z axis is the vertical axis. These coordinates are known to the base station/system by means of, for example, GPS measurements.

The UE may, in a translated coordinate system but with the same fixed orientation, be said to have coordinates (0,0,0) while BSi has coordinates (x0i,y0i,z0i), where $$x0i = xBi - xU, y0i = yBi - yU, z0i = zBi - zU \qquad (1)$$

Since the UE, in addition to having a translated coordinate system, also may have a 3D unknown orientation, the translated coordinates of BSi, seen with the unknown orientation, will be a vector $(x0i', y0i', z0i')$ that is related to the vector $(x0i, y0i, z0i)$ by a 3×3 matrix, herein denoted "A", with unknown entries that expresses the 3D unknown orientation relative to the fixed coordinate system.

Assuming that the z' axis is the normal to the "steering plane", and that the y' axis is the 0 angle direction, the estimated angle of maximum reception, $\phi i'$, as seen by the UE, will be given by $$\phi i' = \arctan(x'/y') \qquad (2a)$$

Assuming that $z0i=0$ (corresponding to a negligible height difference between the UE and the base station) and using the relevant entries of the unknown matrix A, $$\phi i' = \arctan((axx^* x0i + axy^* y0i)/(ayx^* x0i + ayy^* y0i)) \qquad (2b)$$

This expression has four unknown parameters, but since the argument is a ratio, these four parameters only correspond to three degrees of freedom. Therefore $\phi i'$ as a function of $x0i$ and $y0i$ can be expressed as $$\phi i' = \arctan((1^* x0i + axy^{} y0i)/(ayx^{} x0i + ayy^{**} y0i)) \qquad (2c)$$

Now, given at least three unique estimated reference directions $\phi 1'$, $\phi 2'$ and $\phi 3'$, their corresponding vectors $(x01, y01, z01)$, $(x02, y02, z02)$ and $(x03, y03, z03)$ (which are known) and the expression (2c), it is possible for the UE and/or a base station/network to estimate (for example by searching for parameters that fit the observations) the unknown parameters $axy'$, $ayx'$ and $ayy'$.

In a next step, the UE and/or a base station/network may, using the estimated parameters and the expression (2c) transform an estimated direction (to a white space transmitter with unknown position) into a ratio $x0j/y0j$ using an expression of the type $$(x0j/y0j) = (axy' - ayy'^* \tan(\phi j'))/(ayx'^* \tan(\phi j') - 1) \qquad (3)$$

As an alternative to transforming an estimated white space transmitter direction $\phi j'$, it is also possible to use the reference data pairs $(\phi 1', x01/y01)$, $(\phi 2', x02/y02)$, $(\phi 3', x03/y03)$ as a basis for interpolating a ratio $x0j/y0j$ that corresponds to the measured white space transmitter angle, $\phi j'$.

Figure 4:
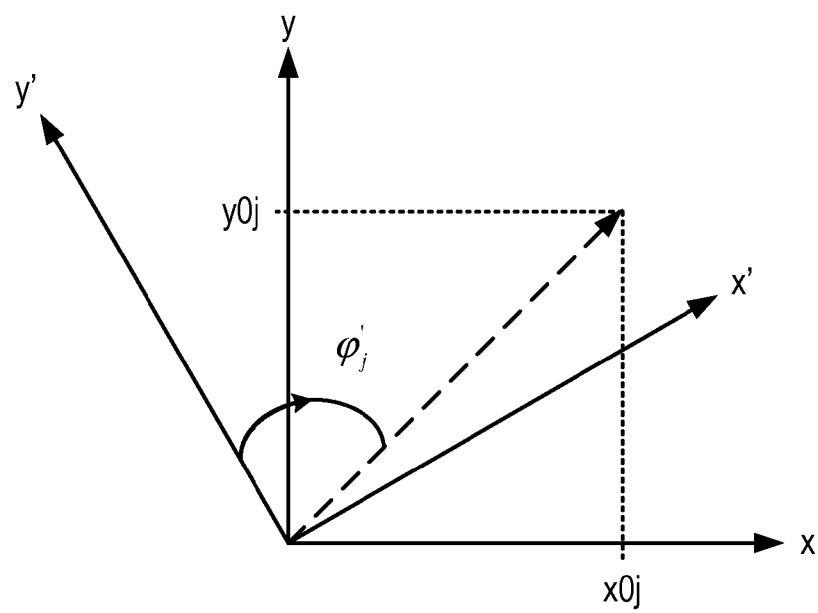
FIG. 4 illustrates several coordinate systems relevant to aspects of the invention: one coordinate system including a zero direction of a sensor's steering plane, and another coordinate system including a zero direction of a "normal" reference system that is used by a serving base station

FIG. 4 illustrates the several coordinate systems referenced above. In this figure, y' is the zero direction of the sensor's steering plane, and y is the zero direction of a "normal" reference system that is used by the serving base station.

In an alternative embodiment, both transforming and interpolation may be used (as a way of supervising the success of the quite complicated transformation) and then the transforming result may be chosen over the interpolation result as long as the two are fairly equal.

The discussion so far has focused on the UE's collection of sensing information and the reporting of this (in some embodiments processed) information to the serving base station. The serving base station's operation will now be described with reference to FIG. 5, which is, in one respect, a flow chart of steps/processes/functions, carried out by an exemplary base station consistent with the invention. In another respect, FIG. 5 can be considered to depict the various elements of circuitry 500 configured to carry out the various functions described in FIG. 5 and its supporting text.

The base station receives, from each one of two or more user equipments operating in accordance with the invention (see, e.g., FIG. 3 and supporting text), sensing information from which licensed user transmitter location information can be determined, wherein the licensed user transmitter location information is oriented in a coordinate system used by the serving base station (step 501).

In some embodiments, one or more of the UEs having access to the geographical positions of the base stations use this information to transform their estimated angles (indicating the direction(s) to the licensed user transmitter(s) from their own reference system (with unknown 3D orientation) to angles situated in a "normal" latitude and longitude reference system that is used by the serving base station. This normalized information is then provided as white space sensing information to the serving base station.

Alternatively, one or more of the UEs may instead provide information in the form of white space sensing information from which a direction of a licensed user transmitter relative to a position of the user equipment can be determined; and pilot signal sensing information from which a respective one or more directions of one or more base stations relative to the position of the user equipment can be determined, wherein the one or more base stations may or may not include the serving base station. When the information is provided in this form, the serving base station transforms the white space sensing information and the pilot signal sensing information received from the two or more user equipments into the licensed user transmitter location information oriented in a coordinate system used by the serving base station (step 503—depicted in dashed lines to emphasize that this step may not be present in all embodiments). Techniques for performing this transformation were discussed earlier, so the discussion does not have to be repeated.

In another aspect of some but not necessarily all embodiments, the information received by the serving base station includes supplemental information (e.g., obtained by two or more sweeps of a UE's receiver lobe), which it uses to filter out information considered to be unreliable (step 505). More particularly, the serving base station can do this by means of, for example, comparing the information obtained by means of a first sweep of the user equipment receiver lobe with the information obtained by means of the second sweep of the user equipment receiver lobe to ascertain a measure of scanning reliability. The higher the correlation between the first and second sweeps, the more reliable the information. The serving base station then filters elements of the white space sensing information that are associated with a measure of scanning reliability that does not satisfy a predetermined reliability requirement. Such filtering can, for example, be performed by means of weighting information from different UEs as a function of their corresponding reliability levels. Different types of weighting can be applied in different embodiments including, but not limited to, applying a weight of zero to any sensing information that is associated with a measure of scanning reliability that does not satisfy a predetermined reliability requirement (i.e., ignoring such information).

Similar procedures can be followed in embodiments in which the supplemental information is already in the form of licensed user transmitter location information.

Once the base station has the licensed user transmitter location information from the two or more UEs, it uses the information as a basis from which it determines one or more geographical safety margins (e.g., the geographical limits within which the base station and associated UEs may operate in an unlicensed manner without causing interference with the licensed transmitter) (step 507).

The base station then adjusts its transmissions to avoid transmitting signals into a geographical area bounded by the one or more geographical safety margins (step 509). Non-limiting examples of techniques for avoiding transmission into a particular geographical area are described in U.S. patent application Ser. No. 12/758,741 to Andres Reial et al., entitled "Interference Avoidance in White Space Communication Systems", filed on Apr. 12, 2010, which application is hereby incorporated by reference herein in its entirety.

To recap, then, the serving base station (or in yet other alternative embodiments, another node in the network which, for purposes of this discussion, are considered equivalent to a serving base station) has access to:

"white space received power" estimates as a function of direction in a horizontal plane from a number of UEs;

some estimated measure of reliability for each of the white space received power estimates; and the coordinates of the UEs that provided the information. All of this information is called "3D information" in the following discussion. These estimates may have been produced in the UEs and sent to the serving base station/network or, alternatively, the serving base station/network itself may have produced them based upon other types of data communicated by the UEs.

At the serving base station/network level it is possible, using estimated angles from a great number of UEs to discard estimated angles that are suspected of being outliers (e.g., angle measurements that do not fit any angle measurements from other UEs). By doing so, it is not necessary for all of the UEs reporting from a certain area to report correctly.

Based upon the "3D information", the serving base station/network can estimate the position and output power of a number of simultaneous (even same frequency) white space transmitters. Given these estimated positions and output powers, the serving base station/network can better tailor its transmissions (e.g., by adjusting power and/or frequency) to avoid generating interference to licensed transmissions and, if desired, interference to non-licensed transmissions.

The estimated powers of the two or more base stations from which pilot signals were sensed can, of course, be compared with the actual known powers and used to validate the accuracy of the estimates. The "3D information" can also be used for closed loop control of the "tailored transmissions".

Figure 6:
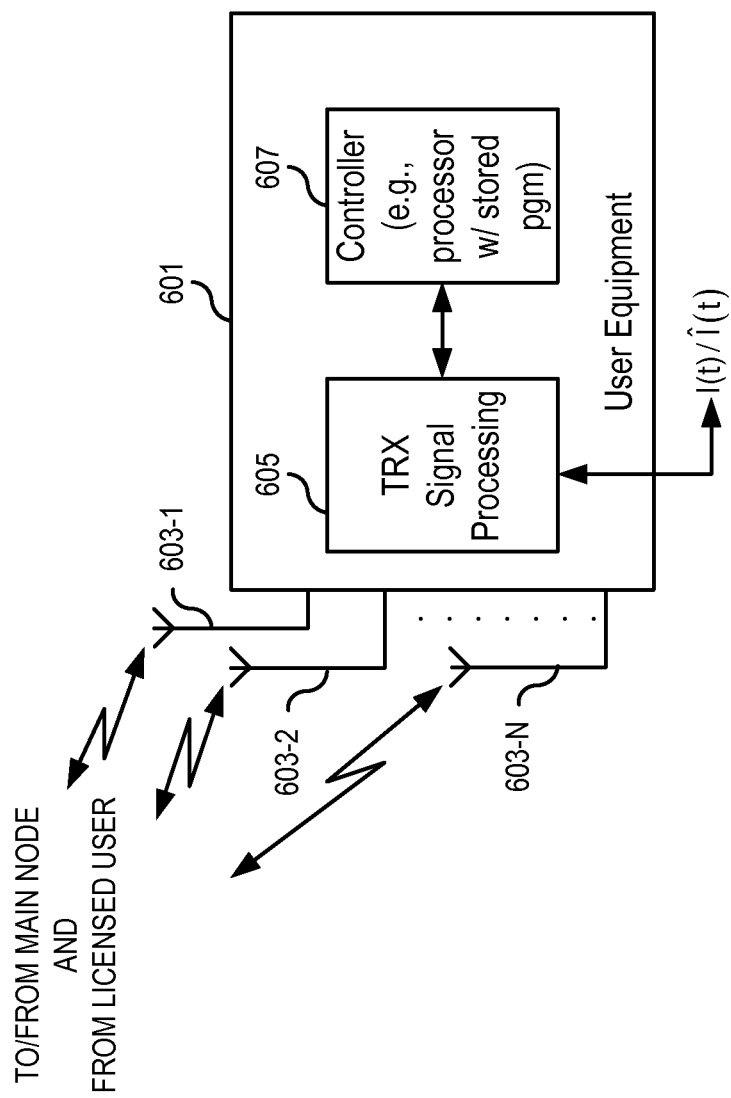
FIG. 6 is a block diagram of a UE adapted with circuitry configured to carry out the various aspects of the invention.

To further illustrate aspects of embodiments consistent with the invention, FIG. 6 is a block diagram of an exemplary UE 601 adapted with circuitry configured to carry out the various aspects of the invention. For the sake of clarity, only those components having particular relevance to the invention are depicted. Those of ordinary skill in the art will readily understand that the UE 601 also includes other circuitry (not depicted) that is well-known in the art and therefore need not be described herein.

In this example, the UE 601 employs so-called multiple-input, multiple-output (MIMO) communication technology. MIMO systems employ multiple antennas at the transmitter and receiver (e.g., the UE's antennas 603-1, 603-2, ..., 603-N) to transmit and receive information. The receiver can exploit the spatial dimensions of the signal at the receiver to achieve higher spectral efficiency and higher data rates without increasing bandwidth. However, the use of MIMO communication technology is by no means essential to the invention; in alternative embodiments, the UE 601 could employ just a single antenna, so long as it is possible for the UE's reception to have steerable reception capabilities.

The base station (main node) (not shown in FIG. 6) communicates with the UE 601 via a multipath channel. In downlink transmissions, an information signal, I(t), (e.g., in the form of a binary data stream) is supplied to the base station, which applies such processes as error coding, mapping the input bits to complex modulation symbols, and generating transmit signals for each of one or more transmit antennas. After upward frequency conversion, filtering, and amplification, the base station transmits the transmit signals from its one or more transmit antennas the channel to the UE 601.

Receiver equipment in the UE 601 demodulates and decodes the signal received at each of its antennas 603-1, 603-2, ..., 603-N. The UE 610 includes a controller 607 for controlling operation of various UE components, including transceiver signal processing circuitry 605. The transceiver signal processing circuitry 605 demodulates and decodes the signal transmitted from the base station. In the absence of bit errors, the output signal from the UE 501, $\hat{I}(t)$, will be the same as the original information signal I(t).

The UE 601 is further capable of using its transceiver processing circuitry 605 to generate a radio frequency signal from an original information signal, I(t), and to transmit this radio frequency signal to a serving base station via its one or more antennas 603-1, 603-2, ..., 603-N.

The controller 607 is further configured to cause the UE 601 to carry out processes such as those exemplified by FIG. 3. Thus, the controller 607 causes the transceiver signal processing circuitry 605, in conjunction with other circuitry in the UE 601, to perform the above-described sensing operations, in some embodiments also to transform and/or filter the acquired data, and then to communicate the information to the serving base station.

Figure 7:
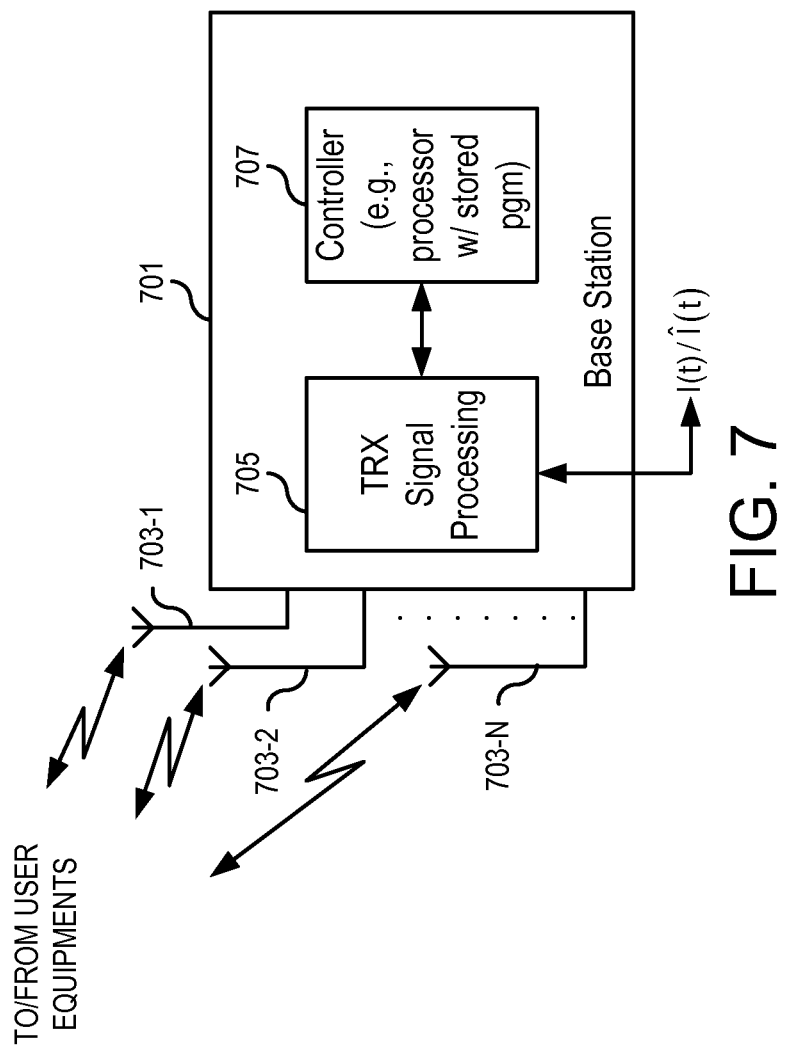
FIG. 7 is a block diagram of a base station adapted with circuitry configured to carry out the various aspects of the invention.

To still further illustrate aspects of embodiments consistent with the invention, FIG. 7 is a block diagram of an exemplary base station 701 adapted with circuitry configured to carry out the various aspects of the invention. For the sake of clarity, only those components having particular relevance to the invention are depicted. Those of ordinary skill in the art will readily understand that the base station 701 also includes other circuitry (not depicted) that is well-known in the art and therefore need not be described herein.

In this example, the base station 701 employs so-called multiple-input, multiple-output (MIMO) communication technology, and therefore includes a plurality of antennas at the transmitter and receiver (e.g., the base station's antennas 703-1, 703-2, ..., 703-N) to transmit and receive information. The transceiver can exploit the spatial dimensions of the signal during both reception and transmission to achieve higher spectral efficiency and higher data rates without increasing bandwidth. However, the use of MIMO communication technology is by no means essential the invention; in alternative embodiments, the base station 701 could employ just a single antenna.

As explained earlier, the base station (main node) communicates with the one or more UEs (not shown in FIG. 7) via a multipath channel. In downlink transmissions, an information signal, I(t), (e.g., in the form of a binary data stream) is supplied to the base station, which applies such processes as error coding, mapping the input bits to complex modulation symbols, and generates transmit signals for each of one or more transmit antennas. After upward frequency conversion, filtering, and amplification, the base station 701 transmits the transmit signals from its one or more transmit antennas the channel to the UE.

Receiver equipment in the base station 701 demodulates and decodes the signal received at each of its antennas 703-1, 703-2, ..., 703-N. The base station 701 includes a controller 707 for controlling operation of various base station components, including transceiver signal processing circuitry 705. The transceiver signal processing circuitry 705 demodulates and decodes the signals transmitted from the UEs. In the absence of bit errors, the output signal from the base station 701, $\hat{I}(t)$, will be the same as the original information signal I(t) generated by one of the UEs.

The base station 701 is further capable of using its transceiver processing circuitry 705 to generate a radio frequency signal from an original information signal, I(t), and to transmit this radio frequency signal to one or more of the UEs via its one or more antennas 703-1, 703-2, . . . , 703-N.

Figure 5:
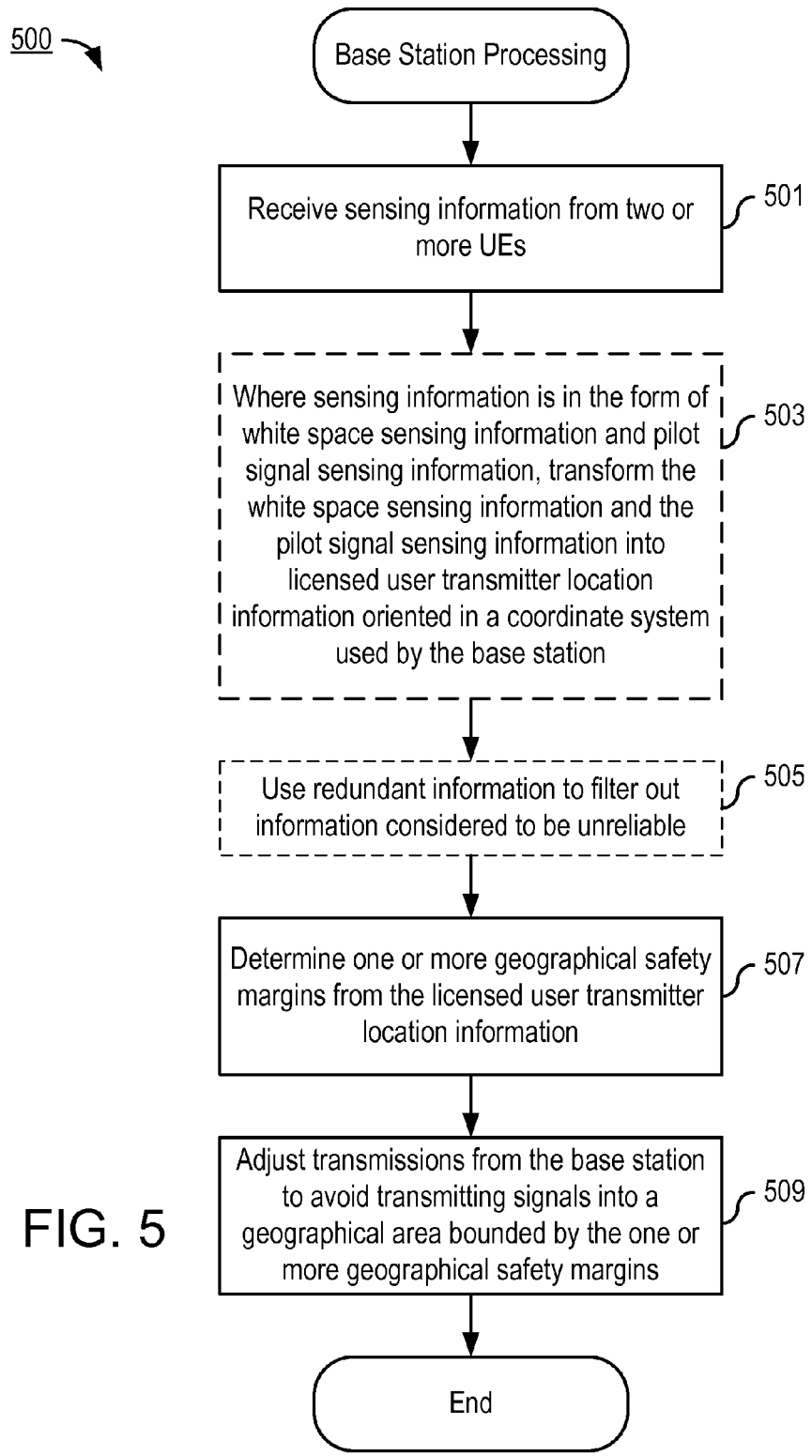
FIG. 5 is, in one respect, a flow chart of steps/processes/functions, carried out by an exemplary base station consistent with the invention.

The controller 707 is further configured to cause the base station 701 to carry out processes such as those exemplified by FIG. 5. Thus, the controller 707 causes the transceiver signal processing circuitry 705, in conjunction with other circuitry in the base station 701, to perform the above-described sensing information reception, possible conversion to a coordinate system used by the base station 701, possible filtering when supplemental information is supplied, and determining of one or more geographical safety margins from the licensed user transmitter location information. The controller 707 then adjusts the base station's transmissions to avoid transmitting signals into a geographical area bounded by the one or more geographical safety margins.

Due to the combined 3D sensing information provided by two or more UEs, base stations/networks can tailor their use of white space and even control the tailored transmissions in a closed loop operation. Therefore, it is possible to improve the usage of white space without unintentionally causing interference to a licensed user of the licensed spectral resource.

The invention has been described with reference to particular embodiments. However, it will be readily apparent to those skilled in the art that it is possible to embody the invention in specific forms other than those of the embodiment described above.

For example, for the sake of clarity, the various embodiments described above have been presented in the context of an unlicensed user wishing to detect the presence of a licensed user's signals. However, the technological solutions offered are not limited to situations involving only licensed and unlicensed users, but are equally applicable whenever communication equipment (referred to herein as "own" communication equipment) wishes to operate in a geographical area without disturbing transmissions from an "other" communication equipment. The presence or absence of a licensed is of no technological consequence, and this aspect does not limit the scope of the invention.

In another aspect, the above-described embodiments all assume that a serving base station determines the location of an "other" transmitter (e.g., a licensed white space transmitter) based on information supplied by two or more UEs. However, in some embodiments it is sufficient (i.e., for purposes of determining the location of an "other" transmitter) for a serving base station to collect information from even as few as only one UE if it additionally obtains sensing information from one or more base stations. The UE and the base stations in this context operate as remote sensors that report to the serving base station.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating own mobile communication system equipment to locate a transmitter that is using a spectral resource, wherein the own mobile communication system equipment includes a serving base station that serves at least one user equipment, the method comprising:

operating the serving base station to receive, from each one of two or more remote sensors, sensing information from which transmitter location information can be determined, wherein the transmitter location information is oriented in a coordinate system used by the serving base station and wherein the remote sensors include at least one user equipment;

determining one or more geographical safety margins from the transmitter location information; and adjusting transmissions from the serving base station to limit transmitting signals into a geographical area bounded by the one or more geographical safety margins, wherein for each of the at least one user equipment, the sensing information supplied by the at least one user equipment comprises:

white space sensing information from which a direction of the transmitter relative to a position of the user equipment can be determined; and pilot signal sensing information indicative of a respective one or more directions of one or more base stations, wherein the pilot signal sensing information is oriented in a steering plane of the user equipment, wherein the one or more base stations may or may not include the serving base station, and wherein the method comprises operating the serving base station to transform the white space sensing information and the pilot signal sensing information received from the at least one user equipment into the transmitter location information oriented in a coordinate system used by the serving base station.

2. The method of claim 1, wherein operating the serving base station to transform the white space sensing information and the pilot signal sensing information received from the at least one user equipment into transmitter location information comprises:

operating the serving base station to use the pilot signal sensing information to ascertain, for each of the at least one user equipment, respective steering plane orientation information; and operating the serving base station to use the steering plane orientation information of the at least one user equipment and the white space sensing information from the at least one user equipment to ascertain the transmitter location information in the coordinate system used by the serving base station.

3. The method of claim 1, wherein the white space sensing information and the pilot signal sensing information each comprise information representing angles and received power at the respective angles.

4. The method of claim 1, wherein:

the white space sensing information comprises information obtained by means of a first sweep of the user equipment receiver lobe and information obtained by means of a second sweep of the user equipment receiver lobe; and the method comprises comparing the information obtained by means of the first sweep of the user equipment receiver lobe with the information obtained by means of the second sweep of the user equipment receiver lobe to ascertain a measure of scanning reliability.

5. The method of claim 4, wherein operating the serving base station to transform the white space sensing information and the pilot signal sensing information received from the at least one user equipment into transmitter location information oriented in the coordinate system used by the serving base station comprises ignoring elements of the white space sensing information that are associated with a measure of scanning reliability that does not satisfy a predetermined reliability requirement.

6. The method of claim 1, comprising:
operating a user equipment to generate the white space sensing information from which the direction of the transmitter relative to the position of the user equipment can be determined;
operating the user equipment to generate the pilot signal sensing information from which the direction of the one or more base stations relative to the position of the user equipment can be determined; and
operating the user equipment to communicate the white space sensing information and the pilot signal sensing information to the serving base station.

7. The method of claim 6, wherein operating the user equipment to generate the white space sensing information from which the direction of the transmitter relative to the position of the user equipment can be determined comprises:
sweeping a receiver lobe of the user equipment at least one revolution while making white space received power estimates to obtain a set of white space received power estimates as a function of direction.

8. A method of operating a user equipment to sense a transmitter that is using a spectral resource, the method comprising:
operating the user equipment to generate white space sensing information from which a direction of the transmitter relative to the position of the user equipment can be determined;
operating the user equipment to generate pilot signal sensing information indicative of a respective one or more directions of one or more base stations, wherein the pilot signal sensing information is oriented in a steering plane of the user equipment, wherein the one or more base stations may or may not include the serving base station; and
operating the user equipment to communicate the white space sensing information and the pilot signal sensing information to a serving base station.

9. The method of claim 8, wherein operating the user equipment to generate the white space sensing information from which the direction of the transmitter relative to the position of the user equipment can be determined comprises:
sweeping a receiver lobe of the user equipment at least one revolution while making white space received power estimates to obtain a set of white space received power estimates as a function of direction.

10. The method of claim 9, wherein:
sweeping the receiver lobe of the user equipment at least one revolution while making white space received power estimates to obtain a set of white space received power estimates as a function of direction comprises sweeping the receiver lobe of the user equipment at least two revolutions while making white space received power estimates to obtain at least two sets of white space received power estimates as a function of direction; and
the method comprises:
the user equipment comparing respective ones of the at least two sets of white space received power estimates as a function of direction with one another to obtain a measure of scanning reliability,
wherein operating the user equipment to communicate the white space sensing information and the pilot signal sensing information to the serving base station is performed only if the measure of scanning reliability satisfies one or more predetermined criteria.

11. The method of claim 8, wherein operating the user equipment to generate the white space sensing information from which the direction of the transmitter relative to the position of the user equipment can be determined comprises:
sweeping a receiver lobe of the user equipment at least one revolution during a sweep time;
making white space received power estimates as a function of direction from the radio signal received during the sweep time; and
including within the white space sensing information only those white space received power estimates and their respective directions that satisfy predetermined reception power criteria.

12. An apparatus for operating own mobile communication system equipment to locate a transmitter that is using a spectral resource, wherein the own mobile communication system equipment includes a serving base station that serves at least one user equipment, the method comprising:
circuitry configured to operate the serving base station to receive, from each one of two or more remote sensors, sensing information from which transmitter location information can be determined, wherein the transmitter location information is oriented in a coordinate system used by the serving base station and wherein the remote sensors include at least one user equipment;
circuitry configured to determine one or more geographical safety margins from the transmitter location information; and
circuitry configured to adjust transmissions from the serving base station to limit transmitting signals into a geographical area bounded by the one or more geographical safety margins,
wherein for each of the at least one user equipment, the sensing information supplied by the at least one user equipment comprises:
white space sensing information from which a direction of the transmitter relative to a position of the user equipment can be determined; and
pilot signal sensing information indicative of a respective one or more directions of one or more base stations, wherein the pilot signal sensing information is oriented in a steering plane of the user equipment, wherein the one or more base stations may or may not include the serving base station,
and wherein the apparatus comprises circuitry configured to transform the white space sensing information and the pilot signal sensing information received from the at least one user equipment into the transmitter location information oriented in a coordinate system used by the serving base station.

13. The apparatus of claim 12, wherein the circuitry configured to transform the white space sensing information and the pilot signal sensing information received from the at least one user equipment into transmitter location information comprises:
circuitry configured to use the pilot signal sensing information to ascertain, for each of the at least one user equipment, respective steering plane orientation information; and
circuitry configured to use the steering plane orientation information of the at least one user equipment and the white space sensing information from the at least one user equipment to ascertain the transmitter location information in the coordinate system used by the serving base station.

14. The apparatus of claim 12, wherein the white space sensing information and the pilot signal sensing information each comprise information representing angles and received power at the respective angles.

15. The apparatus of claim 12, wherein:
   the white space sensing information comprises information obtained by means of a first sweep of the user equipment receiver lobe and information obtained by means of a second sweep of the user equipment receiver lobe; and
   the apparatus comprises circuitry configured to ascertain a measure of scanning reliability by comparing the information obtained by means of the first sweep of the user equipment receiver lobe with the information obtained by means of the second sweep of the user equipment receiver lobe.

16. The apparatus of claim 15, wherein the circuitry configured to transform the white space sensing information and the pilot signal sensing information received from the at least one user equipment into transmitter location information oriented in the coordinate system used by the serving base station comprises circuitry configured to ignore elements of the white space sensing information that are associated with a measure of scanning reliability that does not satisfy a predetermined reliability requirement.

17. The apparatus of claim 12, comprising:
   circuitry configured to cause a user equipment to generate the white space sensing information from which the direction of the transmitter relative to the position of the user equipment can be determined;
   circuitry configured to operate the user equipment to generate the pilot signal sensing information from which the direction of the one or more base stations relative to the position of the user equipment can be determined; and
   circuitry configured to operate the user equipment to communicate the white space sensing information and the pilot signal sensing information to the serving base station.

18. The apparatus of claim 17, wherein the circuitry configured to operate the user equipment to generate the white space sensing information from which the direction of the transmitter relative to the position of the user equipment can be determined comprises:
   circuitry configured to sweep a receiver lobe of the user equipment at least one revolution while making white space received power estimates to obtain a set of white space received power estimates as a function of direction.

19. An apparatus for operating a user equipment to sense a transmitter that is using a spectral resource, the apparatus comprising:
   circuitry configured to operate the user equipment to generate white space sensing information from which a direction of the transmitter relative to the position of the user equipment can be determined;
   circuitry configured to operate the user equipment to generate pilot signal sensing information indicative of a respective one or more directions of one or more base stations, wherein the pilot signal sensing information is oriented in a steering plane of the user equipment, wherein the one or more base stations may or may not include the serving base station; and
   circuitry configured to operate the user equipment to communicate the white space sensing information and the pilot signal sensing information to a serving base station.

20. The apparatus of claim 19, wherein the circuitry configured to operate the user equipment to generate the white space sensing information from which the direction of the transmitter relative to the position of the user equipment can be determined comprises:
   circuitry configured to sweep a receiver lobe of the user equipment at least one revolution while making white space received power estimates to obtain a set of white space received power estimates as a function of direction.

21. The apparatus of claim 20, wherein:
   the circuitry configured to sweep the receiver lobe of the user equipment at least one revolution while making white space received power estimates to obtain a set of white space received power estimates as a function of direction comprises circuitry configured to sweep the receiver lobe of the user equipment at least two revolutions while making white space received power estimates to obtain at least two sets of white space received power estimates as a function of direction; and
   the apparatus comprises:
   circuitry configured to compare respective ones of the at least two sets of white space received power estimates as a function of direction with one another to obtain a measure of scanning reliability,
   wherein the circuitry configured to operate the user equipment to communicate the white space sensing information and the pilot signal sensing information to the serving base station is activated only if the measure of scanning reliability satisfies one or more predetermined criteria.

22. The apparatus of claim 19, wherein the circuitry configured to operate the user equipment to generate the white space sensing information from which the direction of the transmitter relative to the position of the user equipment can be determined comprises:
   circuitry configured to sweep a receiver lobe of the user equipment at least one revolution during a sweep time;
   circuitry configured to make white space received power estimates as a function of direction from the radio signal received during the sweep time; and
   circuitry configured to include within the white space sensing information only those white space received power estimates and their respective directions that satisfy predetermined reception power criteria.

23. A nontransitory computer readable storage medium having stored thereon a set of program instructions that, when executed by one or more programmable processors, cause the one or more programmable processors to perform a method of operating own mobile communication system equipment to locate a transmitter that is using a spectral resource, wherein the own mobile communication system equipment includes a serving base station that serves at least one user equipment, the method of operating the own mobile communication system equipment comprising:
   operating the serving base station to receive, from each one of two or more remote sensors, sensing information from which transmitter location information can be determined, wherein the transmitter location information is oriented in a coordinate system used by the serving base station and wherein the remote sensors include at least one user equipment;
   determining one or more geographical safety margins from the transmitter location information; and
   adjusting transmissions from the serving base station to limit transmitting signals into a geographical area bounded by the one or more geographical safety margins, wherein for each of the at least one user equipment, the sensing information supplied by the at least one user equipment comprises:

white space sensing information from which a direction of the transmitter relative to a position of the user equipment can be determined; and pilot signal sensing information indicative of a respective one or more directions of one or more base stations, wherein the pilot signal sensing information is oriented in a steering plane of the user equipment, wherein the one or more base stations may or may not include the serving base station, and wherein the method comprises operating the serving base station to transform the white space sensing information and the pilot signal sensing information received from the at least one user equipment into the transmitter location information oriented in a coordinate system used by the serving base station.

* * * * *

UNITED STATES PATENT AND TRADEMARK OFFICE
CERTIFICATE OF CORRECTION

PATENT NO.       : 8,526,974 B2
APPLICATION NO.  : 12/758744
DATED            : September 3, 2013
INVENTOR(S)      : Olsson et al.

It is certified that error appears in the above-identified patent and that said Letters Patent is hereby corrected as shown below:

In the Specification

In Column 9, Line 22, in Equation "(2c)", delete " $\varphi\, i' = \arctan((1*x0i+axyy0i)/(ayxx0i+ayy**y0i))$ " and insert -- $\varphi\, i' = \arctan((1*x0i+axy'*y0i)/(ayx'*x0i+ayy'*y0i))$ --, therefor.

Signed and Sealed this
First Day of April, 2014

Michelle K. Lee
*Deputy Director of the United States Patent and Trademark Office*